United States Patent
Schmidt et al.

[11] Patent Number: 6,073,976
[45] Date of Patent: Jun. 13, 2000

[54] SCREWED PIPE JOINT WITH CUTTING RING FOR METAL TUBES

[75] Inventors: Harald Schmidt; Hilmar Hester, both of Wipperfürth; Volker Kaminiski, Halver, all of Germany

[73] Assignee: Armaturenfabrik Hermann Voss GmbH & Co., Germany

[21] Appl. No.: 09/036,461

[22] Filed: Mar. 6, 1998

[30] Foreign Application Priority Data

Mar. 7, 1997 [DE] Germany .......................... 197 09 464

[51] Int. Cl.[7] .................................................... F16L 17/06
[52] U.S. Cl. ...................... 285/341; 285/382.7; 285/910; 285/918
[58] Field of Search ................................ 285/382.7, 341, 285/342, 343, 910, 918

[56] References Cited

U.S. PATENT DOCUMENTS

| | | | |
|---|---|---|---|
| 2,437,632 | 3/1948 | Wolfram | 285/382.7 X |
| 3,708,186 | 1/1973 | Takagi et al. | 285/382.7 X |
| 3,857,591 | 12/1974 | Voss | 285/382.7 X |
| 4,529,231 | 7/1985 | Greenawalt | 285/382.7 X |
| 4,867,489 | 9/1989 | Patel | 285/382.7 X |

FOREIGN PATENT DOCUMENTS

| | | |
|---|---|---|
| 2568665 | 2/1986 | France . |
| 2240917 | 3/1974 | Germany ............... 285/382.7 |
| 4041677 | 6/1992 | Germany . |
| 4219722 | 12/1993 | Germany ............... 285/382.7 |
| 4304534 | 8/1994 | Germany . |
| 4426445 | 2/1995 | Germany . |

*Primary Examiner*—Dave W. Arola
*Attorney, Agent, or Firm*—Harness, Dickey & Pierce P.L.C.

[57] ABSTRACT

A pipe fitting (1) for connecting a metallic pipe line (10), including a pipe union (4), which contains a receiving opening (8) for the pipe line (10), a swivel nut (6), which can be threadedly connected with the pipe union (4), as well as metallic cutting ring (18), which is disposed between the pipe union (4) and the swivel nut (6). The cutting ring (18) with an outer cone (30) acts jointly with an inner cone (28) of the pipe union (4) in such a manner, that, when the swivel nut (6) is tightened, it cuts into the material of the pipe line (10) with at least one cutting edge (32) and generates a form-fitting junction. The cutting ring (18) includes—where it joins an outer cone (30)—an essentially radial contact surface (38) for the purpose of limiting the tightening force, when it comes into contact with a face surface (40) of the pipe union (4). The cutting ring (18), in the transition region between the outer cone (30) and the contact surface (38), contains an elastomeric circumferential seal (44) in such a manner, that the circumferential seal (44), when it is in the assembled condition, is under an elastic pre-stress between the cutting ring (18) on the one hand, and at least one partial region of the interior cone (28) of the pipe union (4), which joins the face surface (40) on the other hand.

13 Claims, 4 Drawing Sheets

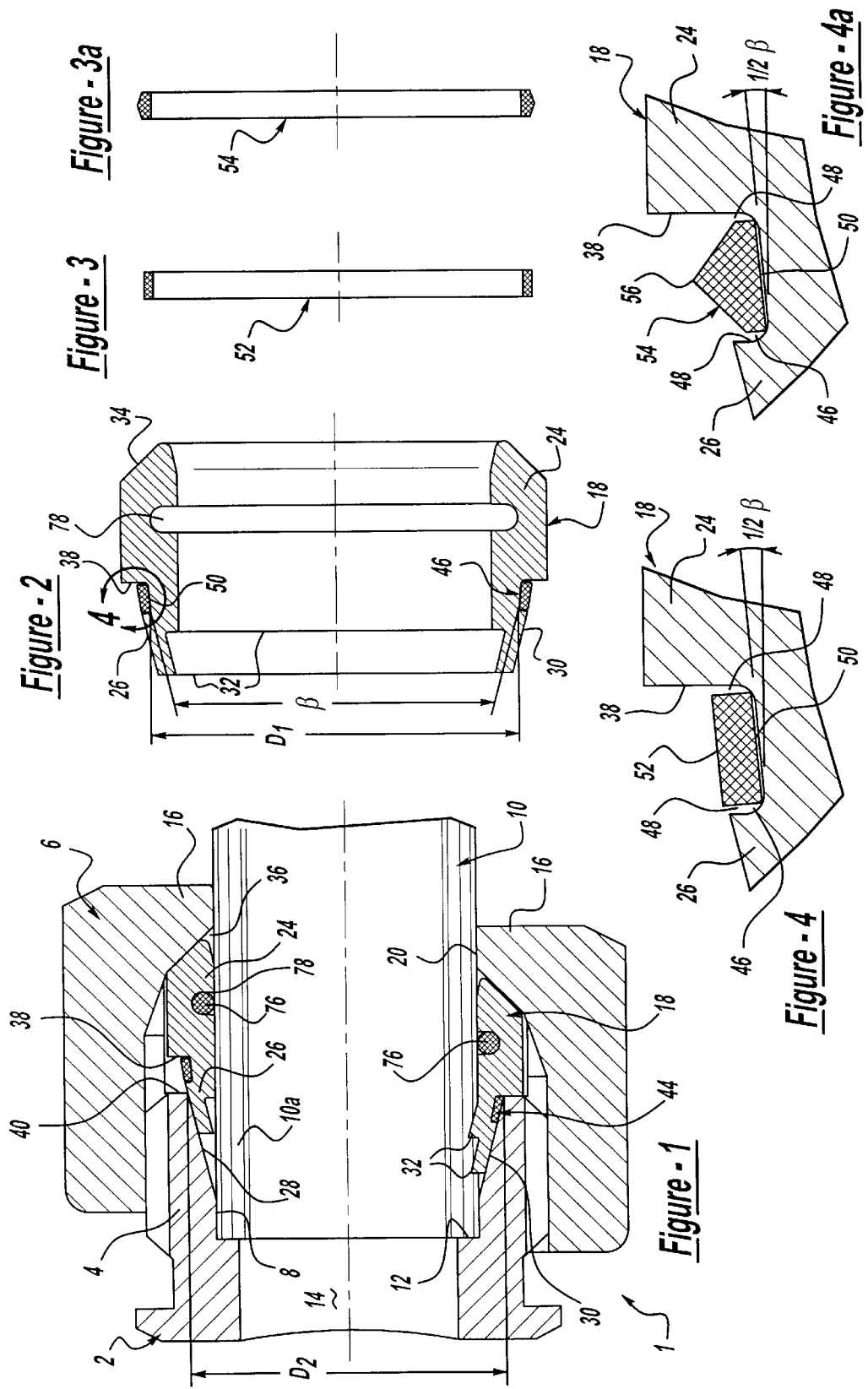

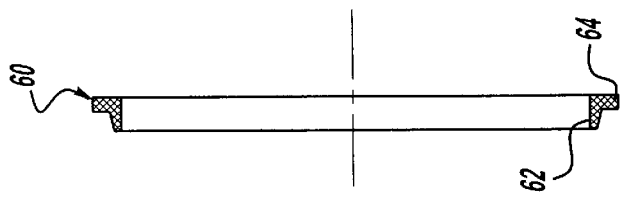
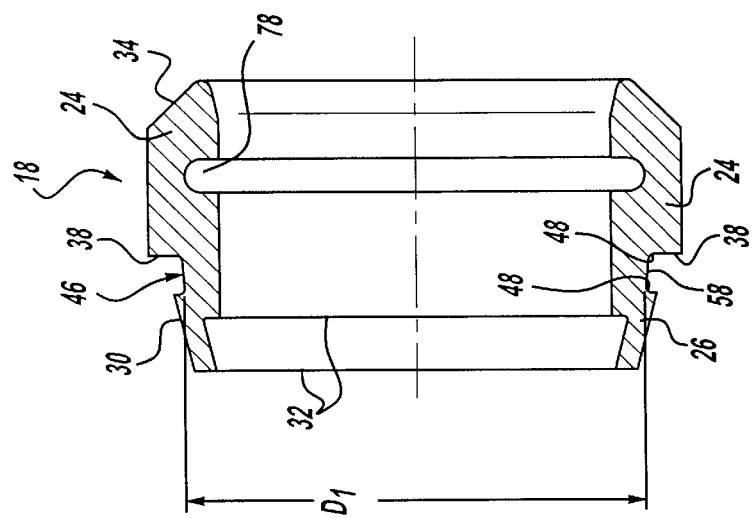
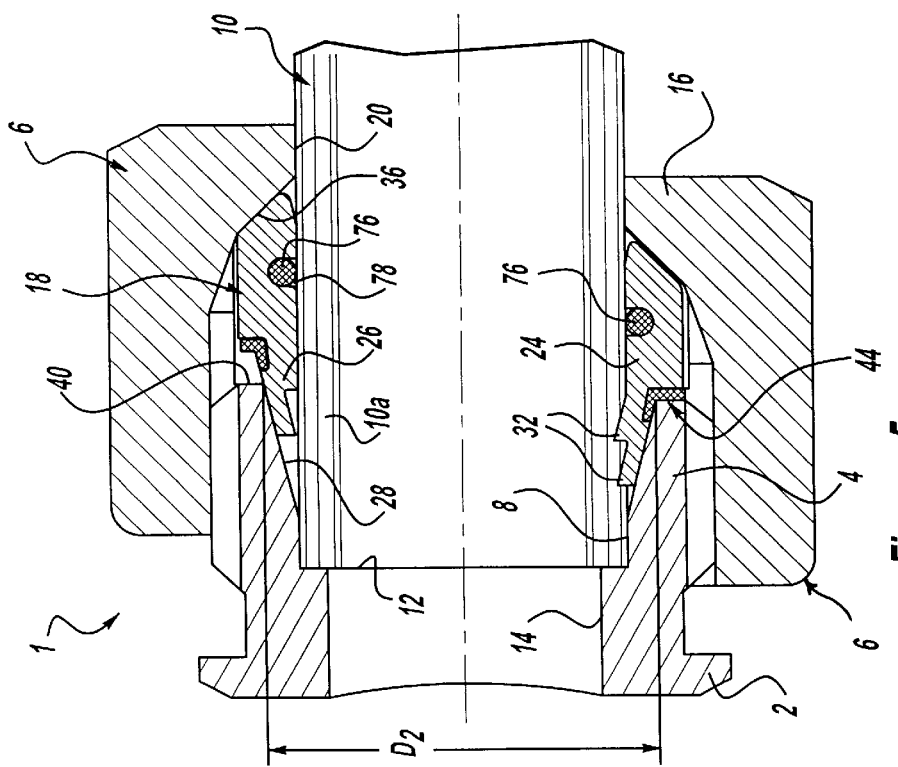

SCREWED PIPE JOINT WITH CUTTING RING FOR METAL TUBES

BACKGROUND AND SUMMARY OF THE INVENTION

The present invention concerns a pipe fitting for connecting in a pipe line, in particular a metallic one, with a pipe union containing a receiving opening for the pipe line, a swivel nut, which can be threadedly connected with the pipe union, as well as a metallic cutting ring. The cutting ring is disposed between the pipe union and the swivel nut, where the cutting ring, with an outer cone, acts jointly with an inner cone of the pipe union in such a manner, that the cutting ring—over a certain region—is deformed toward the interior in a radial direction, when the swivel nut is tightened. The cutting ring cuts into the material of the pipe line with at least one cutting edge aided by a notch effect and under conditions of a form-fit, and where the cutting ring contains an essentially radial contact surface where it joins the outer cone for the purpose of generating a contact at a face surface of the pipe union in such a manner, that the tightening force is limited.

Such pipe fittings are sufficiently well known from several publications. Thus, for example, the DE 43 04 534 A1 describes such a "connection system", where only a metallic seal by means of two cutting edges, which cut into the pipe, is provided. The pamphlet deals primarily with the improvement of the mechanical support of the pipe line, for which the cutting ring is to consist of a fully hardened material or a material that is hardened throughout. Optionally, the cutting ring may, in this case, include a coating over at least a portion of its extent, which in particular may contain PTFE, and which coating reduces friction—and thus improves the sliding ability.

A similar pipe fitting is disclosed by the FR-A-2 568 665. In this case, a sealing ring—in addition to the metallic seal—is provided, which is positioned axially in front of the cutting ring in the gap between the pipe line and the interior cone of the pipe union. Here, under certain circumstances a "flowing away" of the sealing material, especially into the gap between the union and the pipe, can occur. This is, of course, detrimental to the sealing effect.

Something similar is described by the DE 44 26 445 C2. In addition, in the case of this well known pipe fitting, it is contemplated, that an open surface be provided between the outer cone of the cutting ring and its contact surface in such a manner, that when it is assembled, a free space is generated between the open surface and the interior cone of the union. By this means, radial stress concentrations at the front face of the pipe union are to be avoided.

In the DE 40 41 677 a pipe fitting is described, which is not of the same general type inasmuch as a so-called excessive assembly cannot be avoided by means of limiting the tightening force, because the cutting ring does not include a radial stop surface. However, several different embodiments of an additional seal arrangement with at least one circumferential seal made of an elastomeric material have already been described. In this case, primarily only the gap, which is located directly between the pipe line and the interior surface of the pipe union, is sealed. In some embodiments the seal is practically divided into two sealing elements, where either the cutting ring is sealed against the pipe line and the pipe union, or the swivel nut is sealed directly against the pipe union and the pipe line.

The present invention is now based on the task of improving a pipe fitting of this general type, especially with regard to its sealing capability.

According to the invention this has been achieved, in that the cutting ring includes an elastomeric circumferential seal in the transition region between the outer cone and the contact surface in such a manner, that, in the assembled condition, the circumferential seal, which is subjected to an elastic initial stress (in a chamber), is disposed between the cutting ring, on the one hand, and at least one partial region of the interior cone of the pipe union, which is adjacent the face surface, on the other hand.

In this case, it is especially advantageous, that a good retention of the circumferential seal can be ensured, so that a "flowing away" of sealing material can be largely avoided. To do this, it is advantageous if the circumferential seal is located in a circular groove of the cutting ring, which is formed between the outer cone and the contact surface. Preferably, the circular groove blends directly into the contact surface. By this it is meant, that the circular groove, which on its two axial sides is bounded by essentially radial flank surfaces, blends directly into the contact surface, so that this flank surface of the groove and the contact surface lie practically in a common plane.

Preferably, the circumferential seal is either located only in the cone region with a primarily radial sealing effect or, however, it is disposed in combination in the cone region as well as between the contact surface and the face surface of the pipe union with a radial as well as an axial sealing effect. In the latter case, the contact surface of the cutting ring is thus indirectly brought into contact with the face surface of the pipe union by way of a section of the circumferential seal.

In order to achieve an especially good and reliable seal even against high internal pressures of the system, it is advantageous, if the circular groove receiving the circumferential seal has a groove bottom, which, with regard to its diameter is at least in a certain region—smaller than the largest diameter at the face end of the interior cone of the pipe union in such a manner, that, in a chamber thus formed toward the interior cone, a circumferential seal can be housed, which has sufficiently large volume for a compression of the seal. This can, additionally, also be influenced by a certain design of the circumferential contour of the circular groove or the bottom of the groove, for which a few different embodiments will be described in greater detail below. By means of the contour of the circular groove, by the way, the deformation behavior of the cutting ring can be favorably influenced, when the fitting is tightened.

Further advantageous design characteristics of the invention are contained in the dependent claims as well as in the description below.

On the basis of several preferred examples of embodiments shown in the drawing, the invention shall be explained in greater detail below. The following is shown:

BRIEF DESCRIPTION OF THE DRAWINGS

FIG. 1 is a longitudinal section through a pipe fitting according to the invention in a first embodiment, where in the upper half of the figure a condition prior to the tightening of the swivel nut is shown, while the lower half of the figure shows it after it has been assembled, when the swivel nut has been tightened, FIG. 2 is an axial section of the cutting ring of the embodiment according to FIG. 1 in a condition prior to the first deformation caused by the assembly process, FIG. 3 an axial sectional view of an elastomeric circumferential seal according to the invention in a first embodiment, FIG. 3A is a second embodiment of the circumferential seal in a presentation according to FIG. 3, FIG. 4 is a greatly magnified presentation of the partial region IV according to FIG. 2 with the embodiment of the circumferential seal according to FIG. 3, FIG. 4A is a presentation according to FIG. 4, however, with an alternate version of the circumferential seal according to FIG. 3A, FIG. 5A is a second embodiment of the pipe fitting according to the invention shown like FIG. 1, i.e. the upper half of the figure is shown prior to the first assembly and the lower half shows an assembly condition, where the fitting has been tightened, FIG. 6 is in the axial section, a cutting ring according to the embodiment of FIG. 5, FIG. 7 is a circumferential seal according to the embodiment of FIG. 5 in the axial section.

In the various figures of the drawing, the same parts are always given the same reference symbols and they are, therefore, as a rule always only described once.

DETAILED DESCRIPTION OF THE PREFERRED EMBODIMENT

Figure 8:
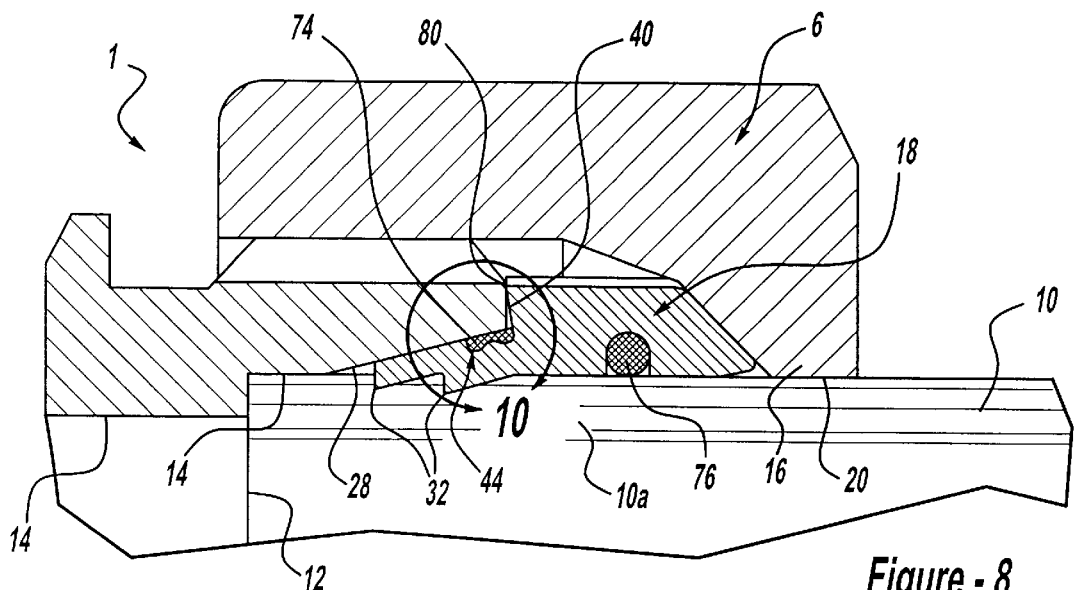
FIG. 8 is a semi-axial section of a third embodiment of the pipe fitting according to the invention in a condition, which follows a preliminary assembly of the cutting ring and the first manual effort of tightening the swivel nut.

A pipe fitting 1 according to the invention consists in general, i.e. in the case of all the examples of the embodiments shown, of a base body 2, which is always only hinted at, which contains at least one pipe union 4 containing an outer thread, upon which pipe union a swivel nut 6 has been threaded or can be threaded. The pipe union 4 includes a receiving opening 8 for an end 10a of a pipe line 10—especially one made of steel or another metal. It is useful to form the receiving opening 8 by means of a bore, which—by way of a radial circular step 12—blends into a channel 14 of a reduced diameter, which extends farther into the base body 2, and which channel is preferably flush with the interior diameter of the pipe line 10. In this case, the circular step 12 forms a contact surface for the end 10a of the pipe line 10.

Between the pipe union 4 and a circular collar 16 of the swivel nut 6, which collar points toward the inside in a radial direction, there is a metallic cutting ring 18, which envelops the pipe line 10. The circular collar 16 has or envelops a through-opening 20 for the pipe line 10. The cutting ring 18 consists of a basic ring portion 24, which is disposed in the intervening space between the pipe union 4 and the swivel nut 6 or the circular collar 16, respectively, and a part 26 of the cutting ring, the annular thickness of which is reduced and which is like a piece of pipe, and which extends from the basic ring portion 24 in the direction of the pipe union 4. The receiving opening 8 of the pipe union 4 is enlarged in the end region, which faces the swivel nut 6 by way of the interior cone 28. The cutting ring 18 engages this interior cone 28 by means of the cutting ring part 26, and thus it acts jointly with a tapered exterior cone 30 and with the interior cone 28 in such a manner, that as a result of an axial generation of a pre-stress during the tightening of the swivel nut 6, the cutting ring 18 in the region of the cutting ring part 26 is deformed (crushed) radially toward the inside, and thus penetrates with two circular cutting edges 32, which are preferably axially spaced from each other and point toward the inside, into the material of the pipe line 10 with a notch-like effect, in particular under conditions of a form-fit.

The basic ring part 24 also preferably includes, on its side which is axially facing away from the cutting ring part 26, an outer cone surface 34 (FIG. 2) which is conically tapering toward its end, and which is in contact with a corresponding interior cone surface 36 of the circular collar 16 of the swivel nut 6. By this means, in this region as well, a wedge effect for the radial compression of the cutting ring 18 as well as self-centering action are achieved.

The cutting ring 18 or the basic ring part 24 includes an essentially radial contact surface 38 on the side, where it faces the cutting ring part 26, which in an assembly position, where the thread is tightened (see always the lower half of the FIG. 1 and 5 as well as the FIG. 9 for comparison) comes into contact with a face surface 40 of the pipe union 4, which face surface limits any further tightening.

The cutting ring 18, on the one hand, has the function of mechanically supporting the pipe line 10 by means of a form-fit connection achieved by way of the cutting edges 32. On the other hand, the cutting ring 18 has, in principle, also a metallic sealing function by way of the cutting edges 32, which cut into the pipe line 10, and by way of the cones 28, 30.

According to the invention, the cutting ring 18 now includes an elastomeric circumferential seal 44 in the transition region between the outer cone 30 and the contact surface 38, and does so specifically in such a manner, that in the assembled condition, the circumferential seal 44 is located between the cutting ring 18, on the one hand, and the interior cone 28 and/or the face surface 40 of the pipe union 4, on the other hand, and it is located inside a chamber under an elastic pre-stress. In the embodiments according to FIGS. 1 to 4 or 4a, on the one hand, and according to FIGS. 8 to 10, on the other hand, the circumferential seal 44 is essentially contained only in the region of the adjacent cones, i.e. the outer cone 30 and the interior cone 28, so that in this manner the contact surface 38 comes into direct contact with the face surface 40. In the embodiment according to FIGS. 5 to 7—as well as in the design according to FIGS. 11 to 13—the circumferential seal 44 is additionally also contained in an axial chamber between the contact surface 38 and the face surface 40, so that hereby the contact surface 38 is directly in contact with the face surface 40 by way of the circumferential seal 44.

The circumferential seal 44 according to the invention is usefully disposed in a circular groove 46 of the cutting ring 18, which is generated between the outer cone 30 and the contact surface 38. Preferably this circular groove 46 blends directly into the contact surface 38. This means that the circular groove 46 is bounded on the two axial sides by essentially radial flank surfaces 48, while the flank surface 48, which is facing away from the outer cone 30 in an axial direction, is located essentially in the same plane as the contact surface 38.

In the embodiment according to FIGS. 1 to 4A, there are now specific provisions made, to ensure that the circular groove 46 has a groove bottom 50, which—when viewed in an axial section—is given a conical shape with a cone angle β (see FIG. 2). In the enlarged presentation in FIGS. 4 and 4A, only half the cone angle 2β is shown in each case. The conical bottom of the groove 50 shows, in particular, a smallest diameter $D_1$ (see FIG. 2) on its side, which is facing the outer cone 30 in an axial direction, which—even before the first deformation of the cutting ring 18, caused by the assembly process—is certainly smaller than the largest diameter $D_2$ (see FIG. 1) at the face surface end of the interior cone 28 of the pipe union 4. In the case of the common standard sizes of the pipe fitting 1 (according to DIN 3861), the diameter $D_1$ of the bottom of the groove 50 is nominally about 0.4 to 0.5 mm below the diameter $D_2$ at the end of the interior cone 28. If the largest diameter $D_2$ of the interior cone 28 according to the above-mentioned DIN has a magnitude of, for example, 14.3 mm, then the bottom of the groove has a diameter $D_1$ of, in particular, about 13.9 mm. The cone angle β is preferably within a size range of from about 10° to 15°, and more particularly amounts to about 12°, i.e. 2×about 6° (2β) from the longitudinal axis.

In conjunction with the contour of the circular groove 46 as described, a profile ring 52 according to FIGS. 3 and 4 can be used advantageously to serve as the circumferential seal 44. This profile ring 52 has an essentially rectangular annular cross-section, while before the assembly, i.e. before being installed in the circular groove 46, it has an essentially hollow cylindrical, hose-like shape. After its installation in the circular groove 46, an adjustment to the conical form of the bottom of the groove 50 takes place; see FIGS. 1 and 2. As an alternative to this, a profile ring 54 according to FIGS. 3A and 4A with an essentially triangular annular cross-section can also be used. As can be seen in particular in the enlarged presentation in FIG. 4A, this profile ring 54 in its radial interior ring regions has preferably a basic ring part with an approximately rectangular cross-section with a triangular region, especially one with an isosceles triangle region, which is adjacent to it in a radial direction toward the outside. By this means a sealing edge 56 is generated, which protrudes in a radially outward direction, and which is formed by a corner of the triangular cross-section. During the assembly process, the profile ring 54 is compressed in the region of the sealing edged 56, so that the profile ring 54 now essentially fills the circular groove 46 (according to the presentation in the lower half of FIG. 1). In this case as well, the profile ring 54 has an essentially cylindrical interior surface prior to the assembly according to FIG. 3A, which then adapts itself to the conical bottom 50 of the groove in the assembled condition.

In the embodiment according to FIGS. 5 to 7, the circular groove 46 has, on the other hand, a bottom 58 of the groove, which, in an axial section, is essentially of a cylindrical shape. The relation of the diameter $D_1$ of this cylindrical bottom 58 of the groove to the largest diameter $D_2$ of the interior cone 28 of the pipe union corresponds to the embodiment according to FIGS. 1 to 4A. However, in this embodiment, a profile ring 60 is used, for example, as the circumferential seal 44, which, according to FIGS. 5 and 7 has an essentially L-shaped annular cross-section with an axial ring section 62, especially one which faces the outer cone 30, and a ring section 64, which extends outwardly in a radial direction. These sections 62, 64 are dimensioned in such a manner, that after assembly—see FIG. 5, lower half—the radial ring section 64 is located between the contact surface 38 of the cutting ring 18 and the face surface 40 of the pipe union 4.

Figure 9:
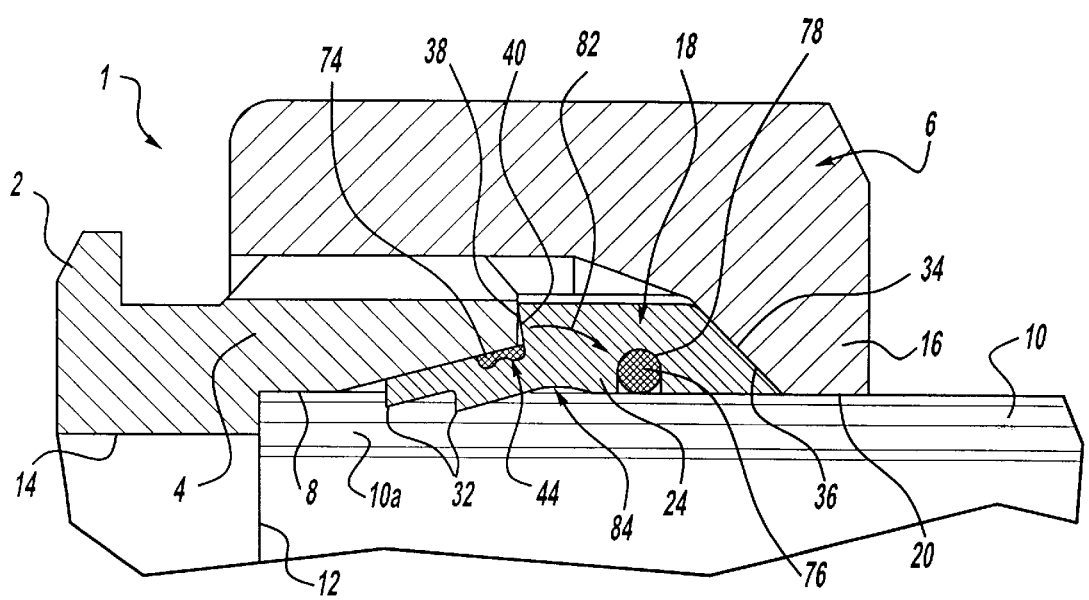
FIG. 9 is the pipe fitting according to FIG. 8 after the final assembly (an assembly condition, where the swivel nut has been tightened)
Figure 10:
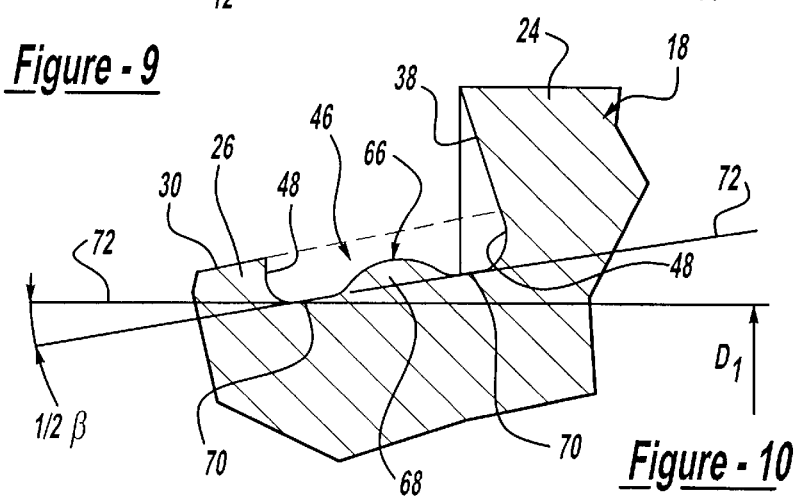
FIG. 10 is an enlarged presentation of the region X of the cutting ring according to FIG. 8.

As far as the embodiment according to FIGS. 8 to 10 is now concerned, the circular groove 44 has a groove bottom 66, which—when viewed in an axial section forms a convex bulge in an approximately central region 68, as well as a preferably concave bulge in both the flank regions (70) (for this, see especially FIG. 10). It is useful if the bulges, usefully, continuously blend into one another. By means of this contour of the circular groove 46, a high degree of compression of the seal is achieved. Furthermore, this contour is also favorable for deformation purposes, as far as the deformation of the cutting ring is concerned, when the fitting is tightened.

As can be further seen from FIG. 10, in the example of the embodiment shown there is a preferred provision, in which the two flank regions 70 of the circular groove 46, which form concave bulges, define an imaginary circumferential plane 72, which—in a manner, which is essentially analogous to the embodiment according to FIGS. 1 to 4A—has a conical in the axial section, with a chosen cone angle β (in FIG. 10, half the cone angle 2β is shown). In this case, a preferred design includes a provision, where by virtue of the cone angle β, the flank region 70, which is axially closest to the outer cone 30, has a smaller diameter than the other flank region 70. However, in principle, this provision could also have been reversed. In any event, here as well the smaller diameter $D_2$ is smaller than the largest diameter $D_2$ of the interior cone 28 of the pipe union. The magnitude of the cone angle β preferably corresponds to that of the embodiment according to FIGS. 1 to 4A.

As an alternative to this, in an embodiment not shown, provision can also be made, that the two flank regions 70 of the circular groove 46 define an imaginary cylindrical circumferential plane, which then once again contains a diameter corresponding to ($D_1$), which is smaller than the largest diameter ($D_2$) of the interior cone 28.

In the embodiment according to FIGS. 8 to 10, a profile ring 74 can be used as the circumferential seal 44, the contour of the annular cross-section of which profile ring has been selected in such a manner, that the profile ring 74, in the assembled condition (FIG. 9), fills the chamber generated by the circular groove 46 and the interior cone 28, but in doing so it is elastically compressed and is, therefore, under a pre-stress.

In all the embodiments shown, the circumferential seal 44 or each of the profile rings 52, 54, 60 or 74, respectively, consists of a suitable elastomeric material. Especially well suited is a material, which uses NBR (nitrile rubber according to DIN ISO 1629) and/or PTFE (polytetrafluoroethylene according to DIN 7728 T1). A material, which is frequently used for seals, is, furthermore, also VITON (brand name of the firm of DuPont); in this case, it involves a heat- and chemical-resistant, fluoro-elastomer, which can be vulcanized, on the basis of Vinylidenefluoride-Hexafluoropropelene-Copolymerisates.

It is further useful to provide an additional elastic sealing ring 76 in all embodiments for the purpose of generating a radial seal between the cutting ring 18 and the pipe line 10. This additional seal ring 76 is usefully located in an interior circular groove 78 of the cutting ring 18, and especially so in the approximately central region of the basic ring part 24 or, however, at a very slight offset from the center in the direction of the ring collar 16 of the swivel nut 6 (see FIGS. 8 and 9).

The additional seal ring 76 is, on the one hand, deformed in a radial inward direction, by the effect of the cone surfaces 34 and 36, when the fitting is tightened. On the other hand, provision can also be made—as is illustrated in the example of the embodiment according to FIGS. 8 to 10—that the contact surface 38 of the cutting ring 18, at least prior to the first assembly process, is so slightly inclined toward the outside in a radial direction as well as axially in the direction of the face surface 40 of the pipe union 4, that is to say somewhat in the form of a hollow cone. When the swivel nut 6 is tightened a deformation of the cutting ring 18 for the purpose of generating a compression force in a portion of the pipe line 10, which is directed radially toward the inside and against the pipe line, and, in particular, this occurs especially in the region of the additional seal ring 76. The inclined, slightly conical nature of the contact surface 38 is shown in a somewhat exaggerated manner in FIG. 10. During the assembly, the cutting ring 18 according to FIG. 8 initially comes into contact with the face surface 40 of the pipe union 4 by way of an outer ring edge 80 of the contact surface 38. In FIG. 9 it is illustrated, that in the assembly position, when the thread is tightened, the contact surface 38 is now in contact with the face surface 40 essentially over its entire area, after the cutting ring has been deformed according to the arrow 82 (FIG. 9) as drawn. By means of this deformation, a slight radial upward bulge 84 is generated approximately in the central region of the cutting ring, i.e. in the transition region between the cutting ring part 26 and the base ring part 24.

In the region of the seal ring 76, the cutting ring is pressed radially in an arcuate shape onto the pipe line 10. The seal ring 76 thus is subject to an effective, clearance-free deformation along the circumference of the pipe line 10.

In particular in the embodiment according to FIGS. 8 to 10, the assembly process occurs as follows. When—for example, after it is tightened by hand—the ring edge 80 is brought into a contact position (FIG. 8), the circumferential seal 44 is inside the interior cone 28 to an extent of about ⅔ of its axial length. There is still a slight axial gap between the contact surface 38 and the face surface 40, which becomes narrower in a radial and outward direction. The additional seal ring 76 is in contact along the circumference of the pipe line 10, however, as yet without an additional compression as a result of the deformation of the cutting ring 18. Starting from this position, the swivel nut is now tightened by approximately 1.25 to 1.5 rotations. By this means, the fitting reaches the assembly position according to FIG. 9. The approximately arc-shaped deformation of the previously conical contact surface 38 of the cutting ring 18 generates, under increasing contact pressure by means of the swivel nut 6 a secure contact, which is free of gaps, with the face surface 40 of the pipe union, and furthermore a perfect receiving chamber for the circumferential seal 44. In this case, because of the special design of the region of the circular groove 46, a change, in particular a reduction, of the volume of the groove now also takes place, so that the circumferential seal 44 is pressed firmly against the interior cone 28 of the pipe union.

After a loosening of the swivel nut 6, the cutting ring 18, which has a slight spring-like elasticity, is relaxed, so that the circumferential seal 44 can be advantageously replaced when necessary.

In the case of a renewed assembly, it would be advantageous, to noticeably limit the tightening of the swivel nut 6 by means of the cutting ring 18, which makes contact with the block.

Figure 11:
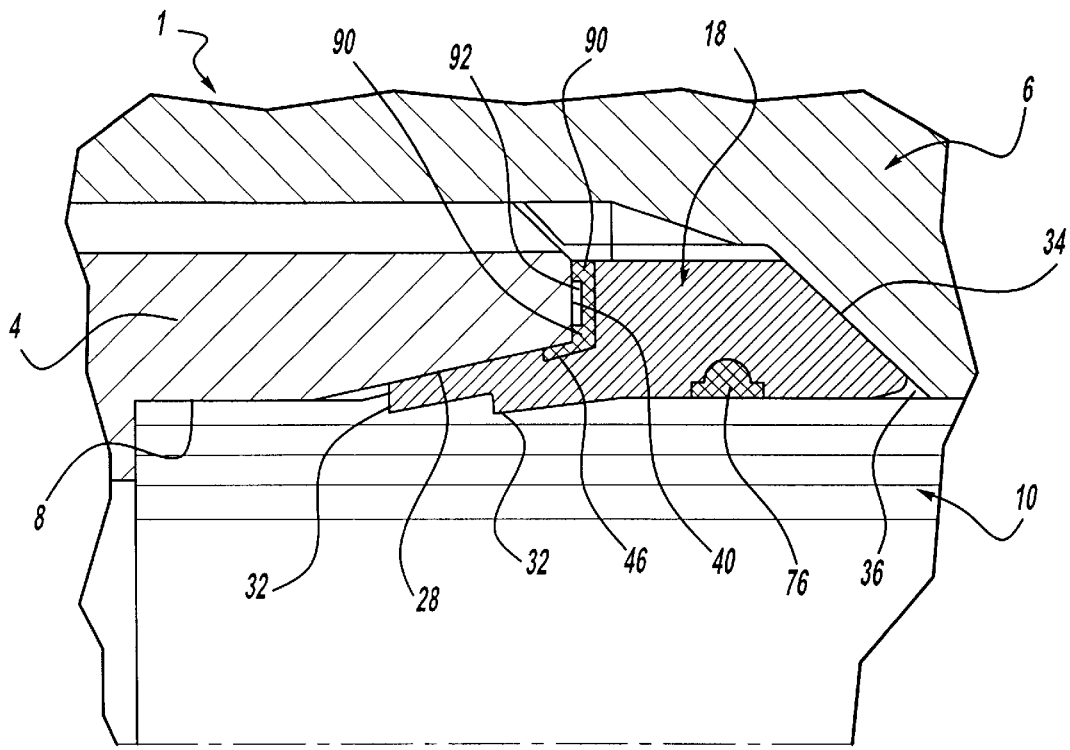
FIG. 11 is a semi-longitudinal section of a further variation of an embodiment of the pipe fitting according to the invention.
Figure 12:
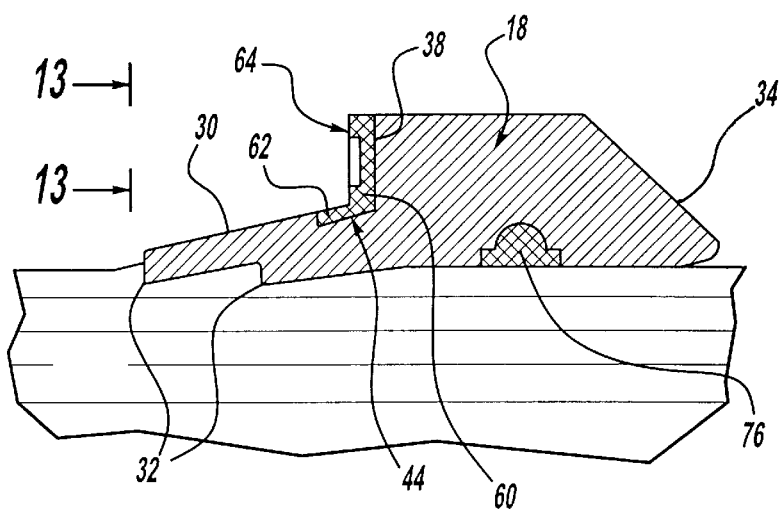
FIG. 12 is a partial view from FIG. 11 of the region of the cutting ring, after it has been attached to the pipe line.
Figure 13:
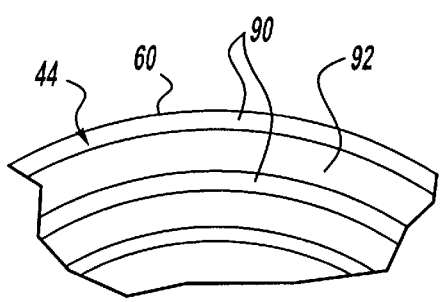
FIG. 13 is a partial frontal view in the direction of the arrow XIII according to FIG. 12.

Finally, as far as the embodiment according to FIGS. 11 to 13 is now concerned, this involves, in particular, a further development of the example of the embodiment according to FIGS. 5 to 7, inasmuch as the radial ring section 64 contains, on its axial contact side, where it points in the direction of the pipe union 4, at least one, but preferably at least two concentric circumferential, circular ridge-like contact ribs 90. These ribs are generated by a radially interposed, axial, groove-like circular indentation 92. This circular indentation 92 has an axial depth T (FIG. 12). Because of the elasticity of the material of the seal 44, a tightening of the fitting can thus—instead of proceeding to a precisely defined contact position—take place beyond a tightening range corresponding approximately to the depth T; by this means, practically a "tightening reserve" is achieved, so as to compensate for a possibly unfavorable tolerance condition of the individual parts. This means, that starting from the position shown in FIG. 11, where the contact ribs 90 have barely achieved contact with the face surface 40 of the pipe union, in case of need, a still further tightening somewhat beyond the range of the depth T is possible. By means of their circular circumferential extension, the contact ribs 90 contribute to a still further improved sealing effect. In other words, by means of the elasticity of the contact ribs 90, even an axial play between the pipe union 4 and the contact surface 38, caused for example by tolerances, which may still be present in the correctly tightened assembly position can be compensated for. The profile ring 60 can be connected to the cutting ring 18 by being made of the same material, for example, by molding it to it or by spraying it onto it.

The invention is not limited to the examples of embodiments shown and described, but it also includes all designs, which act like them within the spirit of the invention. Further, the invention thus far is also still not limited to the combination of the characteristics defined in claim 1, but it can all so be defined by any other combination of certain characteristics at all of all the individual characteristic disclosed overall. This means that, in principle, practically any individual characteristics of claim 1 can be left out, or, respectively, can be replaced by at least one individual characteristic, which was disclosed in another part of the application. In this respect, claim 1 is merely to be understood as a first attempt at a formulation for an invention.

We claim:

1. A pipe fitting for connecting a metallic pipe line, including a pipe union, which contains a receiving opening for the pipe line, a swivel nut, which is threadedly connected to the pipe union, and a metallic cutting ring, the metallic cutting ring disposed between the pipe union and the swivel nut, where the metallic cutting ring includes an outer cone which acts jointly with an inner cone of the pipe union such that, when the swivel nut is tightened, the outer cone is radially deformed toward the interior of the pipe union over a certain region and cuts into the material of the pipe line with at least one cutting edge while utilizing a notch effect and generating a form-fitting junction with the pipeline, and where the metallic cutting ring includes, at the point where the metallic cutting ring joins the outer cone, a radial contact surface for the purpose of limiting the tightening force, when the metallic cutting ring comes into contact with a face surface of the pipe union, characterized in that the metallic cutting ring, in a transition region between the outer cone and the contact surface, contains an elastomeric circumferential seal under an elastic pre-stress between the metallic cutting ring and at least one partial region of the interior cone of the pipe union.

2. Pipe fitting according to claim 1, wherein the circumferential seal is disposed in a circumferential groove of the cutting ring, which groove is generated between the outer cone and the contact surface, where the circumferential groove blends directly into the contact surface.

3. Pipe fitting according to claim 2, wherein the circumferential groove includes a groove bottom, which in the axial section has an essentially cylindrical shape and includes a diameter, which is smaller than the largest diameter at the face surface end of the interior cone of the pipe union.

4. Pipe fitting according to claim 2, wherein the circumferential groove includes a groove bottom, which, in the axial section, is designed as a cone with a cone angle and on the side facing the outer cone when viewed in an axial direction, has a smallest diameter, which is smaller than the largest diameter at the face surface end of the interior cone of the pipe union.

5. Pipe fitting according to claim 4 wherein the cone angle of the bottom of the groove is of a magnitude of 10° to 15°.

6. Pipe fitting according to claim 2, wherein the circumferential groove includes a groove bottom which, when viewed in the axial section, has a convex bulge in an approximately central region and has concave bulges in flank regions.

7. Pipe fitting according to claim 6, wherein the flank regions of the circumferential groove define an imaginary cylindrical circumferential plane, which has a diameter, which is smaller than the largest diameter at the face surface end of the interior cone of the pipe union.

8. Pipe fitting according to claim 6, wherein the flank regions of the circumferential groove having concave bulges define an imaginary circumferential plane, which in an axial section is designed with a cone angle, and where the smaller diameter of the flank region, which is closest to the outer cone in an axial direction, is smaller than the largest diameter at the face surface end of the interior cone of the pipe union.

9. Pipe fitting according to claim 8 wherein the cone angle of the bottom of the groove is of a magnitude of substantially 10° to 15°.

10. Pipe fitting according to claim 1, wherein the circumferential seal is made of a profile ring of an elastomeric material selected from the group consisting of NBR, PTFE, and Viton.

11. Pipe fitting according to claim 10, wherein the profile ring has an essentially rectangular annular cross-section.

12. Pipe fitting according to claim 10, wherein the profile ring has an essentially triangular annular cross-section with a sealing edge, which protrudes outwardly in an approximately radial direction.

13. Pipe fitting according to claim 1, wherein the contact surface of the metallic cutting ring is extended slightly outwardly inclined in a radial direction and axially in the direction of the face surface of the pipe union wherein when the swivel nut is tightened, a deformation of the metallic cutting ring for the purpose of exerting a pressure against the pipe line in a radial inward direction is created.

* * * * *